United States Patent [19]

Siol et al.

[11] Patent Number: 5,066,718

[45] Date of Patent: Nov. 19, 1991

[54] COMPATIBLE POLYMER MIXTURES

[75] Inventors: Werner Siol, Darmstadt-Eberstadt; Ulrich Terbrack, Reinheim, both of Fed. Rep. of Germany

[73] Assignee: Rohm GmbH Chemische Fabrik, Darmstadt, Fed. Rep. of Germany

[21] Appl. No.: 408,527

[22] Filed: Sep. 18, 1989

[30] Foreign Application Priority Data

Sep. 16, 1988 [DE] Fed. Rep. of Germany ....... 3831500

[51] Int. Cl.$^5$ ..................... C08L 33/12; C08L 33/08; C08L 25/14
[52] U.S. Cl. ....................................... 525/84; 525/75; 525/85; 525/226; 525/228
[58] Field of Search ................... 525/226, 228, 84, 85, 525/75

[56] References Cited

U.S. PATENT DOCUMENTS 4,159,288  6/1979  Carson et al. ..................... 525/228

FOREIGN PATENT DOCUMENTS 033574    3/1979  Japan.
57-39745  3/1982  Japan.
61-252263 11/1986 Japan.

OTHER PUBLICATIONS

*Chemical Abstracts*, 107:218684a, p. 44, "Environmental Stress Crack-Resistant Thermoplastic Polymer Compositions", Maeda, Tetsuo, Jpn. Kokai Tokkyo Koho JP 62,164,740.

121220n, "Thermoplastic Resin Compositions," Ide et al, Japan 70 16,818.

*Chemical Abstracts*, vol. 61. 2016-2017, "Plastics With Improved Impact Strength", Badische Anilin- & Soda-Fabrik A.-G. (by Bruno Vollmert), Ger. 1,164,080.

*Primary Examiner*—John C. Bleutge
*Assistant Examiner*—David Buttner
*Attorney, Agent, or Firm*—Oblon, Spivak, McClelland, Maier & Neustadt

[57] ABSTRACT

A compatible polymer mixture of two disparate polymers consisting essentially of:
  A) 0.1–99.9 wt. % of a copolymer comprised of the following monomer units
    a) 90–10 wt. % methyl acrylate;
    b) 10–90 wt. % styrene; and
    c) 0 to <10 wt. % of one or more other monomeric vinyl compounds, other than methyl acrylate and styrene; and
  B) 99.9–0.1 wt. % of a polymer comprised of the following monomer units
    a) >90 to 100 wt. % methyl methacrylate; and
    b) 0 to <10 wt. % of at least one monomeric vinyl compound other than methyl methacrylate.

20 Claims, No Drawings

COMPATIBLE POLYMER MIXTURES

BACKGROUND OF THE INVENTION

1. Field of the Invention

The invention relates to compatible polymer mixtures comprised of polymethyl methacrylate and styrene-methyl acrylate copolymers.

2. Discussion of the Background

When polymers are mixed there is a high likelihood that they will be incompatible (see Kirk-Othmer, "Encyclopedia of Chemical Technology", Vol. 18, 3rd Ed., pub. John Wiley, pp. 443-478 (1982)). Polystyrene and polyalkyl methacrylates are good examples of incompatible polymers. Thus, M. T. Shaw et al. (see Chem. Abstr. 101:73417e) reported a miscibility of only 3.4 ppm polymethyl methacrylate (PMMA, m.w. 160,000) with polystyrene. Even very low molecular weight polystyrene is relatively incompatible with PMMA (Parent, R. R., et al., J. Polym. Sci., Polym. Phys. Ed., 16:1829 (1987). Other polyalkyl methacrylates are also incompatible with polystyrene. Apparently the only exceptions are mixtures of polystyrene and polycyclohexyl acrylate and polycyclohexyl methacrylate (see Ger. OS 36 32 369). Thus, styrene homopolymer is incompatible with nearly all polyalkyl methacrylates, but this incompatibility does not apply in the case of copolymers of styrene and acrylonitrile. Compatibility has been found between certain styrene/acrylonitrile copolymers and PMMA (see Barlow, J. W. et al., Polymer 28:1177 (1987). However, because this compatibility has apparently been found only for very narrowly specified copolymer compositions of the styrene/acrylonitrile component, the compatibility situation is described as having "miscibility windows". In such cases, the miscibility of the specific styrene/acrylonitrile copolymers with PMMA can be attributed to substantial repulsive forces between the styrene unit and the acrylonitrile unit in the copolymer.

A similar condition is believed to prevail in the case of styrene/maleic anhydride copolymers, which are compatible with PMMA at certain ratios of styrene to maleic anhydride. This group of PMMA-compatible styrene copolymers probably includes copolymers of styrene and allyl alcohol and copolymers of styrene and p-(2-hydroxyhexafluoroisopropyl)styrene, the PMMA-compatibility of which has been interpreted as being due to hydrogen bonding of the hydroxyl group with the PMMA ester group (Min, B. Y., and Pearce, Eli M., Org. Coatings and Plast. Chem., 45:58-64 (1981); Cangelori, F., and Shaw, M. T., Polymer Reprints (Am. Chem. Soc., Div. polym. Chem.), 24:258-259 (1983)).

Although compatibility of PMMA with copolymers of styrene and strongly polar monomers such as acrylonitrile, maleic anhydride, allyl alcohol, and p-(2-hydroxyhexafluoroisopropyl)styrene has been known for a number of years, these compatible polymer mixtures have been and continue to be regarded as special exceptions in the large range of incompatible polystyrene/polyalkyl methacrylate mixtures. This view is particularly understandable in that as a rule the compatibility of these styrene copolymers has been limited to PMMA as a mixture partner.

In certain instances and in certain areas of the plastics industry, mechanical mixtures of polymers have led to products with improved properties, and in some cases the range of possible applications of the subject materials has been substantially broadened (see Kirk-Othmer, loc. cit., Vol. 18). The physical properties of such "polyblends" ordinarily represent a compromise; in favorable cases, such compromises can furnish a net improvement in comparison with the properties of the individual polymers. On the other hand, the technical applicability on incompatible (multiphase) polymer mixtures is often evaluated as better than that of compatible mixtures (see Kirk-Othmer, loc. cit., p. 449).

Incompatible mixtures of PMMA and crosslinked styrene-acrylate ester copolymers have found wide application, with the styrene-acrylate rubber incorporated as a tough (high-impact) phase within a PMMA matrix. Particularly successful have been mixtures of PMMA and copolymers of butyl- or ethyl acrylate with styrene, with styrene present in the amount of about 16 wt. % in the copolymer. Styrenebutyl acrylate copolymers with about 16 wt. % styrene have the same index of refraction as PMMA ($n^D_{20} = 1.492$), so that these mixtures are transparent despite being incompatible.

Incompatible mixtures of this type are described, e.g., in Jap. 61/252,263 and 62/164,749, Ger. OS 11 64 080, Jap. 16,818/70, Ger. Pat. App. 33 00 526.5; Hooley, C., et al., Plast. Rubber Process, Appl., 1:345-49, (1981); and Tsutumi, Masahide et al., Jap. 57/39,745. In all these publications the starting material was a styrene acrylate copolymer, as a rule crosslinked, which is incompatible with the PMMA with which it is mixed, and which becomes incorporated in the PMMA matrix. The glass temperature of these styrene-acrylate rubbers is as a rule <0° C. or at least <20° C., and thus these polymers can also act like rubbers. However, a critical factor in their functioning as rubbers is their incompatibility with the PMMA, i.e., the mixed material must be a two-phase material.

Compatible polymer mixtures with favorable mechanical properties can be regarded as technically useful based particularly on the fact that they are expected to have good optical properties. On the other hand, based on the known state of the art, there is little prospect of obtaining technically useful compatible polymer mixtures from components having as their respective components styrene (co)polymers, and polyalkyl (meth)acrylates.

SUMMARY OF THE INVENTION

Accordingly one object of the present invention is to provide compatible polymer mixtures which exhibit a single phase and which have good optical properties.

It has been discovered, that surprisingly, styrene-acrylate ester copolymers form highly compatible polymer mixtures with polymethyl methacrylates (PMMAs), if certain clearly defined limiting conditions are observed.

DETAILED DESCRIPTION OF THE PREFERRED EMBODIMENTS

Accordingly, the present invention relates to compatible polymer mixtures comprised of two different polymer components:

A) A copolymer, present in the amount of 0.1-99.9 wt. %, preferably 5-95 wt. %, particularly preferably 15-85 wt. %, and comprised of the following monomer units

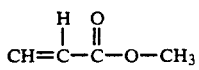
(a)

and

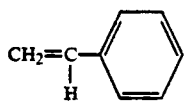
(b)

and optionally c) one or more additional monomeric vinyl compounds other than methyl acrylate or styrene; and B) A PMMA, present in the amount of 99.9–0.1 wt. %, preferably 95–5 wt. %, particularly preferably 85–15 wt. %, and comprised of methyl methacrylate units in the amount of at least 90 wt. %, preferably at least 92–99.5 wt. %, and particularly preferably at least 97–100 wt. %; and with the following conditions:

Monomer units (a) comprise 90–10 wt. %, preferably 85–30 wt. %, particularly preferably 80–40 wt. %, and more preferably 74–45 wt. %, of polymer (A);

Monomer units (b) comprise 10–90 wt. %, preferably 15–70 wt. %, particularly preferably 20–60 wt. %, and more preferably 25–55 wt. %, of polymer (A); and Monomer units (c) comprise 0 to <10 wt. %, preferably 0.5 to <10 wt. %, particularly preferably 1–8 wt. %, of polymer (A).

The vinyl compounds comprising component (c) are monomers commonly used in radical polymerization (see, e.g., "Ullmann's Encyclopaedie der techn. Chemie", Vol.

14, pub. Urban & Schwarzenberg, pp. 108–110 (1963); also "Polymer Component (A)", below).

The methods for characterizing the inventive polymer mixtures PM as compatible mixtures follow recognized criteria (see Kirk-Othmer, loc. cit., Vol. 18, pp. 457–460; and Brandrup-Immergut, "Polymer Handbook", 2nd Ed., pub. Wiley Interscience, p. 111–211 (1975)):

i) The polymer mixtures have a single optical index of refraction, having a value between the indices of refraction of the two individual polymer components (A) and (B); and ii) A single glass transition temperature Tg is found for each polymer mixture PM, having a value between the glass transition temperatures of the two polymer components.

Another test for the miscibility of polymers is the occurrence of a LCST (lower critical solution temperature). The existence of a LCST is indicated when a heretofore clear mixture separates into phases as it is heated, and becomes optically cloudy. This behavior is clear proof that the original polymer mixture was comprised of a single homogeneous phase in equilibrium (see Ger. OS 34 36 476, and U.S. Pat. No. 4,722,595).

Further, polymer mixtures may display the UCST phenomenon. Opposite of the situation with an LCST, such polymer mixtures show compatibility (single phase composition) at high temperature, but incompatibility (phase separation) at lower temperature (see Olabisi, O., Robeson, L. M., and Shaw, M. T., "Polymer-polymer miscibility", pub. Academic Press (1979); Kirk-Othmer, loc. cit., pp. 457–460; and unpublished Ger. Pat. App. P 37 08 428.3).

Preferably, an inventive polymer mixture has a LCST.

Polymer Component (A)

Polymer component (A) is a copolymer comprised of styrene and methyl acrylate units The method of producing such copolymers is per se known (see "Producing the Polymers", below).

Particularly interesting are copolymers comprised solely of styrene and methyl acrylate Other monomeric vinyl compounds may be incorporated as monomer units, as "components (c)", in amounts of up to <10 wt. %, generally 0.5 to <10 wt. %. Preferred compounds are monomers of the styrene type other than styrene itself, e.g. $C_{1-4}$ alkyl styrenes such as alpha-methylstyrene, m-methylstyrene, or p-methylstyrene; or derivatives of acrylic acid other than methyl acrylate, particularly esters of acrylic acid with 2–12 carbon atoms in the alcohol group, e.g. ethyl acrylate, butyl acrylate, or 2-ethylhexyl acrylate.

Polymer component (A) may also contain small proportions (i.e., 1 to <10 wt. %) of methacrylic acid esters, e.g. methyl methacrylate or butyl methacrylate. As a rule these comonomers different from styrene and methyl acrylate are nonpolar. If acrylonitrile, allyl alcohol, 2-(hydroxyhexafluoroisopropyl)styrene, maleic anhydride, or other derivatives of maleic acid are present, their proportion in copolymer (A) is 0.5 to <5 wt. %, preferably <1 wt. %; but particularly preferably it is 0 wt. % (i.e., preferably they are not present)

The proportion of methacrylic acid, acrylic acid, methacrylamides, acrylamides, aminoalkyl esters and aminoalkyl amides, hydroxyalkyl esters and hydroxyalkyl amides, and amides of methacrylic acid and acrylic acid, is also limited. If present, these monomers are present in the amount of 0.5 to <5 wt. %, preferably 0.5 to <3 wt. %, particularly preferably 0.5 to 1.5 wt. %.

Polymer Component (B)

Polymer component (B) is a polymer, preferably a homopolymer, comprised of methyl methacrylate. If polymer component (B) is not pure polymethyl methacrylate, it may contain vinyl monomer units as comonomers, preferably in the amount of 0.5 to <10 wt. %, particularly preferably 0.5 to <5 wt. %. Preferred comonomers are esters of acrylic acid with alcohols which alcohols have 1–12 carbon atoms; e.g., methyl acrylate, ethyl acrylate, or butyl acrylate. Polymer component (B) may also contain styrenes, or esters of methacrylic acid other than methyl methacrylate, e.g. butyl methacrylate or ethyl methacrylate. As mentioned above, the proportion of these monomers is limited to 0.5 to <10 wt. %, preferably <5 wt. %.

Production of the Polymers (A) and (B)

Polymers (A) and (B) can be produced according to the known rules of polymerization and by known methods. The polymers of type (A) can be produced, e.g., according to Houben-Weyl, "Methoden der Organischen Chemie", 4th Ed., Vol. XIV/1, pub. Georg Thieme-Verlag, pp. 761–841 (1961). The radical polymerization method is preferred, but ionic polymerization may be used. The molecular weight M of the polymer (A) is as a rule above 3,000, preferably 5,000–1,000,000, particularly preferably 20,000–500,000, as determined by light scattering. Preferably the polymer (A) is not crosslinked. The homo- or copolymers of type (B) can be manufactured by known methods (see Rauch-Puntigam, H., and Voelker, Th., "Acryl- und Methacrylverbindungen", pub. Springer Verlag (1967)). While, in principle, manufacture by anionic polymerization or group transfer polymerization is possible (see also Webster, O. W., et al., J. Am. Chem. Soc., 105:5706 (1983)), radical polymerization is preferred. The polymerization may be carried out in bulk, in suspension, in emulsion, or in solution.

For radical polymerization, preferably the usual radical initiators are used, e.g. a peroxide type (particularly organic peroxide compounds such as dibenzoyl peroxide or dilauroyl peroxide) or azo type (such as azobisisobutyronitrile), or possibly redox initiators, in customary amounts of about 0.01-2 wt. % (based on the weight of the monomers).

The starting radicals may also be generated by energetic radiation. Regulators employed may comprise the usual sulfur regulators, particularly mercapto compounds, preferably in amounts of about 0.01-2 wt. % (based on the weight of the monomers). The molecular weights of the polymers have a certain influence on the compatibility. Thus, a low molecular weight polymethyl methacrylate (J = 11 ml/g) is appreciably more compatible with a styrene-methylacrylate copolymer than is a polymethyl methacrylate with J = 52 ml/g. (See Examples, below.)

As a rule the molecular weight of polymer (B) is greater than 3,000, generally 10,000 to 1,000,000, preferably 20,000 to 300,000 (as determined by light scattering). In selecting the monomers to be employed as comonomers in (B), one should take into account that the glass transition temperature Tg limits the applicability of the polymer mixture system PM, but does not limit it in a major way. Thus, to produce molded parts from the polymer mixture PM, at least one of the polymers (A) and (B) should have a Tg >70° C., and preferably the polymer mixture should have Tg >70° C. as well. (For determination of Tg, see Paul, D. R., and Newman, S., "Polymer blends", Vol. 1, Chap. 5, pub. Academic Press, New York (1978)). Tg can be estimated based on the monomers (see, e.g., ViewegEsser, "Kunststoff-Handbuch", Vol. IX, pub. Carl Hanser-Verlag, pp. 333-340 (1975)). This limitation applies particularly to manufacture of injection-molded, pressed, or extruded objects. For other areas of application, e.g. paints and the like, elastomers, or reversible thermotropic vitrification (a polymer mixture with a cloud point upon heating, thus for use according to Ger. OS 34 36 477, preferred polymer mixtures PM are those which have a Tg <70° C. However, polymer mixtures PM which have Tg >70° C. are particularly preferred.

Preparation of the Polymer Mixtures (PM)

Various methods may be employed to prepare the compatible mixtures; e.g. intensive mechanical intermixing of the components (A) and (B) in the melt, in an extruder or the like; preparation as "solution cast polyblends" from a common solvent (see Kirk-Othmer, loc. cit., Vol. 18, pp. 443-478); dissolution of polymer (A) in the mixture of monomers for polymer (B), followed by production in the presence of polymer (A); or vice versa (production of polymer (A) in the presence of polymer (B)); or preparation of the polymer mixture PM from common precipitating media.

There are no constraints on the method of mixing. As a rule, mixtures of the components (A) and (B) are produced first. Preferably the starting materials are solids in the form of, e.g., the polymers in bead or granulate form, and the mixing apparatus is of the slow moving type, e.g. a drum mixer, an open-wheel mixer, or a double chamber plow-type mixer. Slow moving equipment achieves mechanical intermixing without strictly eliminating phase boundaries (see "Ullmanns Encyclopaedie der technischen Chemie, 4th Ed., Vol. 2, pub. Verlag Chemie, pp. 282-311). Then the thermoplastic preparation is carried out with homogeneous mixing in the melt, using a heatable apparatus at suitable temperatures, e.g. 150° C.-300° C. Apparatus such as kneader-mixers or, preferably, extruders, e.g., single-screw or multiple-screw extruders, or extruders with oscillating screws and shear rods (such as a Bussco ® kneader-mixer) are suitable. This method can be used to produce a granulate of uniform particle size and shape, e.g. hot-chopped granulate, cubes, or spheres. The particle size of the granulate used is generally in the range 2-5 mm.

Another, quite simple, method of producing the polymer mixture PM is intermixing of polymer dispersions containing the respective polymers, (A) and (B). These mixtures of dispersions may be commonly coagulated, commonly spray dried, commonly extruded in an extruder, or commonly dried to form a film.

Advantageous Effects of the Polymer Mixtures (PM)

An advantage of the polymer mixtures is that, in contrast to mixtures comprised of other poly(meth)acrylates and polystyrenes, they are compatible. That is, in contrast to incompatible mixtures of polystyrenes and poly(meth)acrylates, in the unpigmented state the inventive polymer mixtures are transparent, they do not scatter light, i.e. as a rule haze is <10%. According to the invention, however, they may display a LCST or UCST.

Of particular interest are polymer compositions comprised of the described polymer mixture PM in the amount of about 40-99 wt. %, preferably 70-95 wt. %, and a third polymer P which is chemically differentiable from (A) and (B), in the amount of 60-1 wt. %, preferably 30-5 wt. %, wherewith polymer P is incompatible with polymer (A), polymer (B), and th mixture PM.

As a rule, the composition of the polymer mixture PM is chosen such that the index of refraction of the polymer P coincides with that of the mixture PM. Thus, at room temperature as a rule the following inequality should hold:

$$|n_D^{25}{}_M - n_D^{25}{}_P| < 0.01,$$

where $n_D^{25}{}_{PM}$ is the refractive index of the polymer mixture PM and $n_D^{25}{}_P$ is the refractive index of the third polymer.

In general, the polymer P incompatible with the polymer mixture PM will have Tg <20° C. and will be covalently bonded with at least one of the components of the polymer mixture PM, i.e. with (A) or (B). Polymer P may also be crosslinked Particularly preferred is the case where the polymer P is polybutadiene or polyisoprene. Also of interest are polymers P comprised of crosslinked polyethyl acrylate and polybutyl acrylate, optionally with a small proportion of styrene (e.g. 10-25 wt. %). It is important that polymer P be incompatible with polymer (A), with polymer (B), and with the polymer mixture PM. Particularly preferred is the case where polymer P is at least partially covalently bonded with polymer (A).

Polymer compositions comprised of PM in the amount of 40-99 wt. % and P in the amount of 1-60 wt.

% are distinguished by improved impact strength over that of pure PM, particularly if P has Tg <20° C.

It is also possible to produce an optical fiber with a sheath of polymer (B) around a core part of polymer (A).

Other features of the invention will become apparent in the course of the following descriptions of exemplary embodiments which are given for illustration of the invention and are not intended to be limiting thereof.

EXAMPLES

For these Examples, the VICAT softening temperature is determined according to DIN 53 460. The viscosity index J (ml/g) is determined based on DIN 51 562 (Parts 2 and 3) and DIN 7745 (Part 2). The light permeability, unless stated otherwise, is determined according to DIN 5036. The haze (%) is determined according to ASTM D 1003.

EXAMPLE 1:

Production of polymer component (B1):

Lauroyl peroxide (5 g) and 2-ethylhexylthioglycollate (50 g) were added to 1000 g methyl methacrylate, and polymerization was carried out at 70° C. in aqueous suspension.

After filtration and drying, a polymethyl methacrylate of low molecular weight (J =22 ml/g) was obtained.

EXMAPLE 2:

Polymer component (B2):

A continuously produced copolymer was used as polymer component (B), comprised of methyl methacrylate (96 wt. %) and methyl acrylate (4 wt. %). The molecular weight of this polymer is characterized by J =52 ml/g. Plexiglas ® Y7N (supplied by Rohm GmbH) may be used as the polymer (B) of Example 2.

EXMAPLE 3:

Production of copolymer (A1):

A mixture of methyl acrylate (74.35 g), styrene (25 g), t-dodecyl mercaptan (0.5 g), and azobisisobutyronitrile (0.15 g) was polymerized for 16 hr at 50° C. with exclusion of air, in a bag comprised of Hostaphan ® (supplied by the firm Hoechst). Then the polymer was precipitated out in methanol, and was dried. Because the conversion was not 100%, the composition of the polymer (A1) was determined analytically.

The resulting copolymer (A) had the following composition and viscosity index:

| Methyl acrylate | 53 wt. % |
|---|---|
| Styrene | 47 wt. % |
| J = 47 ml/g. | |

EXAMPLE 4:

Production of Copolymer (A2):

The same polymerization method as in Example 3 was used, but with the following composition of the reaction mixture: methyl acrylate (50.0 g), styrene (50.0 g), t-dodecyl mercaptan (0.5 g), azobisisobutyronitrile (0.15 g). The polymer was precipitated out and analyzed as before.

The resulting copolymer (A2) had the following composition and viscosity index:

| Methyl acrylate | 36 wt. % |
|---|---|
| Styrene | 64 wt. % |
| J = 37 ml/g. | |

EXAMPLE 5:

Production of Copolymer (A3):

The same procedure, including the precipitation procedure, was used as in Examples 3 and 4, but with the following composition of the reaction mixture methyl acrylate (25.0 g), styrene (75.0 g), t-dodecyl mercaptan (0.5 g), azobisisobutyronitrile (0.15 g). The resulting copolymer (A3) had the following composition (by analysis) and viscosity index:

| Methyl acrylate | 23 wt. % |
|---|---|
| Styrene | 77 wt. % |
| J = 27 ml/g. | |

EXAMPLE 6:

Preparation of the compatible polymer mixture (A1)-(B1):

The polymer according to Example 1 (polymer B1) was dissolved in toluene to form a 20 wt. % solution. The polymer according to Example 3 (polymer A1) was also dissolved in toluene (separate batch) to form a 20 wt. % solution. The two solutions were mixed, a film was produced by film casting, and after drying the film was evaluated visually. The mixture ratios (by weight) of B1 to A1 used were: 5:95, 25:75, 50:50, 75:25, and 95:5. In all cases the result was a transparent film which remained transparent when heated to 260° C.

EXAMPLE 7:

Preparation of the compatible polymer mixture (A2)-(B1):

The procedure was as in Example 6, but the polymers used were (A2) and (B1). Here too in all cases the result was a transparent film which showed no clouding when heated to 260° C.

EXAMPLE 8:

Preparation of the compatible polymer mixture (A3)-(B1):

The procedure was as in Examples 6 and 7, but the polymers used were (A3) and (B1). In all cases a transparent film was obtained, but in some cases there was de-mixing upon heating, i.e. these polymer mixtures showed a LCST.

TABLE 1

| Clouding temperatures of polymer mixtures | |
|---|---|
| Mixture ratio (wt. % B1): | Clouding temperature upon heating (°C.): |
| 5 | >260 (i.e. no clouding) |
| 25 | 241 |
| 50 | 166 |
| 75 | 214 |
| 95 | >260 (i.e. no clouding). |

EXAMPLES 9-11:

The procedure was as in the preparations according to Examples 6-8, but the polymer (B) used was polymer (B2) according to Example 2. The mixing partners for B2 were (A1), (A2), and (A3), as before.

The polymer mixtures PM comprising (A1)-(B2) and (A2)-(B2) were compatible in all ratios at room temperature, but de-mixing occurred upon heating (LCST behavior). In some cases the polymer mixture (A3)-(B2) was de-mixed (incompatible) at room temperature.

Table 2 gives the clouding temperatures, namely the temperatures at which an initially transparent sample became cloudy upon heating, as a function of the mixture ratio.

TABLE 2

Clouding temperatures of polymer mixtures (A1)-(B2), (A2)-(B2), and (A3)-(B2).

| Mixture ratio (wt. % B1): | Clouding temperature (°C.) of the mixture of B2 with copolymer: | | |
|---|---|---|---|
| | A1 | A2 | A3 |
| 5 | >260* | 188 | 100 |
| 25 | 217 | 145 | <RT** |
| 50 | 194 | 130 | <RT |
| 75 | >260 | 167 | <RT |
| 95 | >260 | >260 | 167 |

*>260 = no clouding at ≦260° C.
**<RT = cloudy at room temperature.

Evaluation of the Mixture Tests According to Examples 6-11

In a mixture with low molecular weight PMMA (J =11 ml/g), the styrene-methacrylate composition of copolymer (A) can be varied over wide limits without adversely affecting compatibility. However, when a higher molecular weight polymer component (B) is used, in order to retain good compatibility of the polymers certain limits on the ratio of styrene to methacrylate in copolymer (A) must be observed. In particular, high styrene content in copolymer (A) must be avoided. An LCST is characteristic of the polymer mixtures PM, i.e. good compatibility of the polymers at low temperatures and de-mixing at higher temperatures.

EXMAPLE Example 12:

Preparation of a polymer mixture PM with an EPDM as an incompatible mixture component P:

Epsyn55® (200.0 g), an ethylene-propylenenorbornadiene terpolymer supplied by the firm Copolymer, was dissolved in butyl acetate (800.0 g), and the solution (solution of polymer P) was heated to 120° C.

The following mixture was added dropwise to this solution at 120° C., over a period of 20 min:

| | |
|---|---|
| Methyl acrylate | 36.0 g |
| Styrene | 24.0 g |
| (The mixture of methyl acrylate and styrene comprises a mixture of monomers of polymer (A).) | |
| t-Butyl peroctanoate | 1.35 g |
| Butyl acetate | 90.0 g. |

Then, also at 120° C., the following mixture was added in small amounts, over a period of 100 min:

| | |
|---|---|
| Methyl methacrylate | 340.0 g |
| (the monomer of polymer (B)) | |
| Butyl acetate | 510.0 g |
| t-Butyl peroctanoate | 4.7 g |

After cooling to 80° C., the following mixture was added:

| | |
|---|---|
| Methyl methacrylate | 10.0 g |
| Trisallyl cyanurate | 10.0 g |
| t-Butyl peroctanoate | 4.0 g. |

The resulting mixture was stirred 2 hr at 80° C. and then 2 hr a 90° C.

After cooling to room temperature, an organic dispersion was obtained which was precipitated in methanol. The precipitated polymer was dried under a vacuum. The dried polymer (in the amount of 30% wt. %) was mixed with a PMMA according to Example 2 (PMMA with J =52 ml/g) (in the amount of 70 wt. %). A polymer composition was obtained which had the following approximate composition:

| | |
|---|---|
| EPDM (polymer P) | 10 wt. % |
| Copolymer of styrene and methyl acrylate (= polymer A), partially grafted onto the EPDM | 3 wt. % |
| PMMA (= polymer B), partially grafted onto the EPDM | 87 wt. %. |

Test bodies (standard small rods) comprised of this polymer composition were injection molded on an injection molding machine. The following measurements were obtained (values in parentheses are comparison values for pure PMMA):

| | |
|---|---|
| Vicat softening temperature, (16 hr, 80° C.): | 100° C. (108° C.) |
| Impact strength (kJ/m$^2$) | 63 (15) |
| Notched-bar impact strength (kJ/m$^2$) | 5.5 (1.5). |

Obviously, numerous modifications and variations of the present invention are possible in light of the above teachings. It is therefore to be understood that within the scope of the appended claims, the invention may be practiced otherwise than as specifically described herein.

WHAT IS NEW AND DESIRED TO BE SECURED BY LETTERS PATENT OF THE UNITED STATES IS:

1. A compatible polymer mixture of two disparate polymers consisting essentially of:
   A) 0.1-99.9 wt. % of a non-crosslinked copolymer comprised of the following monomer units
      a) 90-10 wt. % methyl acrylate;
      b) 10-90 wt. % styrene; and
      c) 0 to <10 wt. % of one or more other monomeric vinyl compounds, other than methyl acrylate and styrene; and
   B) 99.9-0.1 wt. % of a polymer comprised of the following monomer units
      a) >90 to 100 wt. % methyl methacrylate; and
      b) 0 to <10 wt. % of at least one monomeric vinyl compound other than methyl methacrylate.

2. The compatible polymer mixture of claim 1, consisting essentially of 5-95 wt. % copolymer A and 95-5 wt. % polymer B.

3. The compatible polymer mixture of claim 1, consisting essentially of 15-85 wt. % copolymer A and 85-15 wt. % polymer B.

4. The compatible polymer mixture of claim 1, wherein polymer B comprises at least 97 wt. % methyl methacrylate.

5. The compatible polymer mixture of claim 1, wherein copolymer A consists of 85-30 wt. % methyl acrylate and 15-70 wt. % styrene.

6. The compatible polymer mixture of claim 1, wherein polymer B consists of 92-99.5 wt. % methyl methacrylate and 8-0.5 wt. % of acrylic acid ester monomer units.

7. The compatible polymer mixture of claim 1, wherein said monomeric vinyl compounds are selected from the group consisting of $C_{1-4}$ alkyl styrenes and esters of acrylic acid with $C_{2-12}$ alcohols.

8. The compatible polymer mixture of claim 1, wherein at least one of copolymer A and polymer B have a Tg greater than 70° C.

9. The compatible polymer mixture of claim 1, wherein polymer B is polymethyl methacrylate.

10. The compatible polymer mixture of claim 1, wherein said compatible polymer mixture has a single optical index of refraction value, said value lying between the indices of refraction of copolymer A and polymer B.

11. The compatible polymer mixture of claim 1, wherein said compatible polymer mixture has a single glass transition temperature value, said value lying between the glass transition temperatures of copolymer A and polymer B.

12. The compatible polymer mixture of claim 1, wherein copolymer A comprises 80-40 wt. % methyl acrylate and 20-60 wt. % styrene.

13. The compatible polymer mixture of claim 1, wherein copolymer A comprises 74-45 wt. % methyl acrylate and 25-55 wt. % styrene.

14. A polymer composition comprising 40-99 wt. % of a compatible polymer mixture of two disparable polymers consisting essentially of:
A) 0.1-99.9 wt. % of a non-crosslinked copolymer comprised of the following monomer units
   a) 90-10 wt. % methyl acrylate;
   b) 10-90 wt. % styrene; and
   c) 0 to <10 wt. % of one or more other monomeric vinyl compounds, other than methyl acrylate and styrene; and
B) 99.9-0.1 wt. % of a polymer comprised of the following monomer units
   a) >90 to 100 wt. % methyl methacrylate; and
   b) 0 to <10 wt. % of at least one monomeric vinyl compound other than methyl methacrylate, and
C) 60-1 wt. % of a third polymer, wherein said third polymer is chemically different from copolymer A and polymer B and is incompatible with copolymer A and polymer B.

15. The polymer composition of claim 14, comprising 30-5 wt. %, of said third polymer.

16. The polymer composition of claim 14, wherein $$|n_D{}^{25}{}_{PM} - n_D{}^{25}{}_P| < 0.01,$$

where $n_D{}^{25}{}_{PM}$ is the refractive index of the polymer mixture PM and $n_D{}^{25}{}_P$ is the refractive index of the third polymer.

17. The polymer composition of claim 14, wherein said third polymer is polybutadiene, polyisoprene, crosslinked polyethylacrylate or crosslinked polybutyl acrylate.

18. The compatible polymer mixture of claim 14, wherein copolymer A comprises 80-40 wt. % methyl acrylate and 20-60 wt. % styrene.

19. The copolymer of claim 14, wherein copolymer A comprises 74-45 wt. % methyl acrylate and 25-55 wt. % styrene.

20. A polymer composition comprising 40-99 wt. % of a compatible polymer mixture of two disparable polymers consisting essentially of:
A) 0.1-99.9 wt. % of a copolymer comprised of the following monomer units
   a) 90-10 wt. % methyl acrylate;
   b) 10-90 wt. % styrene; and
   c) 0 to <10 wt. % of one or more other monomeric vinyl compounds, other than methyl acrylate and styrene; and
B) 99.9-0.1 wt. % of a polymer comprised of the following monomer units
   a) >90 to 100 wt. % methyl methacrylate; and
   b) 0 to <10 wt. % of at least one monomeric vinyl compound other than methyl methacrylate, and
C) 60-1 wt. % of a third polymer, wherein said third polymer is chemically different from copolymer A and polymer B and is incompatible with copolymer A and polymer B, wherein said third polymer is at least partially covalently bonded with copolymer A.

* * * * *